June 22, 1937.  H. HEINIS  2,084,440
TRAINING APPARATUS
Original Filed March 9, 1933  2 Sheets-Sheet 1

June 22, 1937.  H. HEINIS  2,084,440
TRAINING APPARATUS
Original Filed March 9, 1933  2 Sheets—Sheet 2
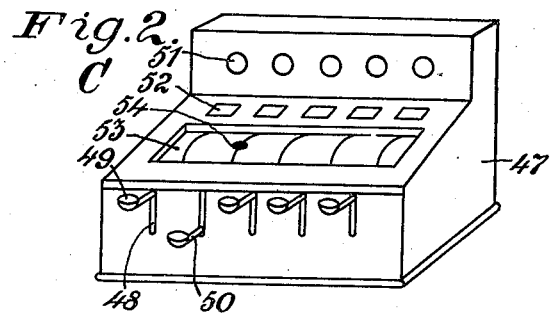
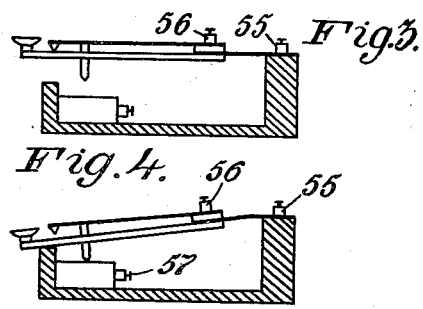
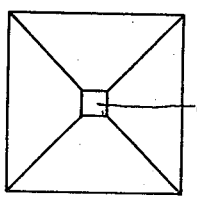
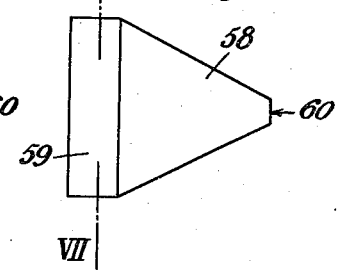
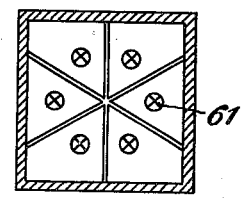
Inventor:
Hugo Heinis
By E. F. Wenderoth
Atty Patented June 22, 1937

2,084,440

UNITED STATES PATENT OFFICE 2,084,440

TRAINING APPARATUS

Hugo Heinis, Geneva, Switzerland

Application March 9, 1933, Serial No. 660,188
In Switzerland March 11, 1932. Renewed
April 20, 1937

10 Claims. (Cl. 35—11)

The invention consists in the combination of a plurality of devices, in part known, in order to create an apparatus better adapted for determining the reactive faculty of a person to certain stimuli provided, and for the systematic exercise of said reactions to said stimuli, and the whole invention is intended more particularly for the training of prospective chauffeurs.

There already exist a number of apparatus for registering the time interval which elapses during a reaction, particularly by means of chronoscopes or means for registering curves, etc. From the purely psychological point of view such means are of no great value as regards the aptitudes which may be developed in a person, or as regards the observation of such a development as is rendered possible by a systematic training. The human mind cannot be analyzed as a steam engine may be, by the simple observation of a curve, such as the curve of the variations in pressure with regard to the course of the piston, and this for the simple reason that the mind is naturally complex.

If then a special faculty of a person is to be developed, it is not sufficient to have a single, somewhat inexact means for determining whether said person is capable of developing the said faculty, nor is a single approximate means sufficient for developing that faculty.

As is already known, our subconscious mind registers certain phenomena, which implant themselves the more deeply the more often the stimuli, which cause them, and the corresponding reactions which it is desired to produce, are repeated. In proportion to the number of times the exercises are repeated, said phenomena which, at the start, only traverse our conscious mind continuously penetrate more deeply into the subconscious mind until the stimulus produces an automatic reaction, a reaction which is perhaps no longer under our control: we thus enter into the domain of reflex actions.

The devices hitherto utilized for psychotechnic measures, some of which form an integral part of the apparatus according to the invention, never go beyond the simple somewhat inexact system of tests which is employed when a man is considered as a machine, and this is the reason applicant deemed it necessary to construct a new device going beyond this rather too simple program, and also giving rise to the possibility of increasing, by systematic exercises which are of course governed by simple means, the quickness of our reflexes.

This invention will therefore be seen not to concern a device which is intended for the passing of a test, but to treat of a correction and instruction apparatus, and this is why reference will be made hereinafter to instructor and pupil.

The apparatus according to my invention is characterized by a certain number of means for producing stimuli, such, for example, as colored lights, or acoustic signals; by an equal number of members for setting into action said means for producing stimuli; by an equal number, less one, of time-registering apparatus, such, for example, as chronoscopes; by a double number of contacts which act on said apparatus, half the number of said contacts forming the members for setting the means for producing stimuli into action, and having in part, the shape of a switch, and putting a registering apparatus into action at the same time as they actuate a stimulus, the other half being located where the reaction is to take place, and serving to stop the registering apparatus; and finally, by a circuit which can be branched across one of the registering apparatus, the said circuit comprising a starting member and a stopping member for the said apparatus.

The circuit last described makes it possible to effect the customary determination of what is known as a simple reaction, consisting, for the instructor's part, in putting the needle of the registering apparatus abruptly into action, and for the pupil's part, in instantaneously stopping said needle, when he sees it move.

The repeated exercise of this simple reaction permits the instructor to determine the pupil's own minimum time-interval of reaction, a time-interval which of course varies from one person to another; and the instructor knows that it will be useless for him to try to get his pupil to react in less time during the exercise of the complex reactions which are to be hereinafter described. This determination of the minimum time-interval does not, by any means, entail an infinite number of steps. It will be sufficient for the instructor to exercise the reaction a great number of times, without, however, always reading the result obtained; a few readings made from time to time will enable the instructor to determine perfectly well whether he has reached the limit beyond which any progress is impossible.

By the complex reactions which follow this first exercise are meant reactions which are produced by means of several stimuli, each reaction being compared against a certain reaction, which is determined beforehand, for each different stimulus, By prolonging the exercise of such complex reactions until an average time-interval, corresponding to the pupil's own minimum time-interval, is obtained for the complex reactions, the pupil's reactions to the stimuli employed become automatic. The pupil is then in the same position as regards said stimuli, as a good cyclist is as regards keeping his balance.

The apparatus, a form of execution of which is to be described, permits the exercise of systematic reactions according to the plan just described, and this plan may be completed as for instance in the case of the training of a prospective chauffeur, by adding to it certain parts constituting, for example, a model automobile, and the reactions which are produced then consist in operating selected parts of the model automobile.

The drawings, which show one form of execution by way of example, shows in Fig. 1 the diagram of the apparatus, and in Figs. 2 to 7 different details.

Fig. 2 is a box of contacts, which is designated by C in the diagram, and Figs. 3 and 4 are sectional views of two positions of a contact associated with the box.

Figs. 5 to 7 show a particularly appropriate arrangement of the luminous signals, and Fig. 7 corresponds to the section through VII—VII of Fig. 5.

Figure 1:
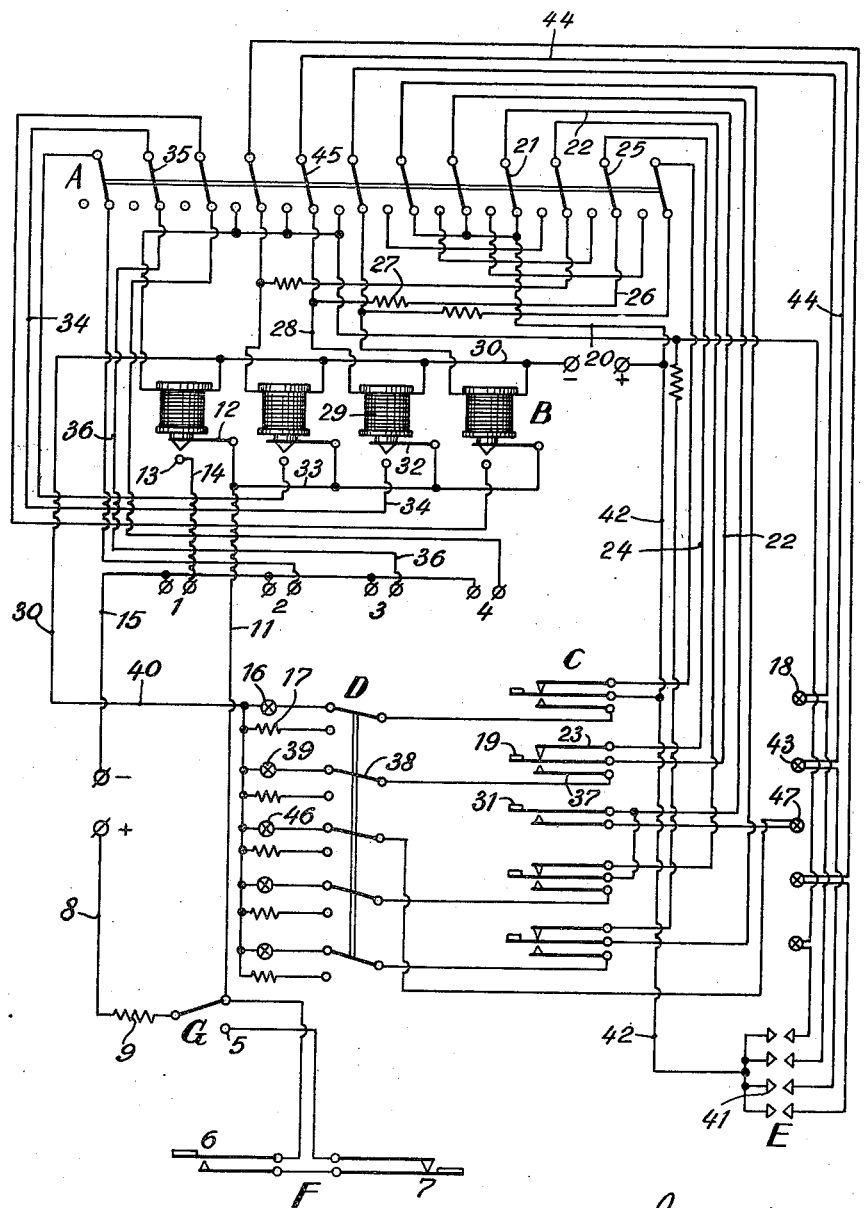

In the diagram of Fig. 1, are shown at A, a twelve-pole switch, at B a group of four relays, at C the keys of a controlling device for the operation by the instructor of the stimuli, at D a five-pole switch, permitting the modification, at will, of the kind of stimuli utilized, at E the contacts by means of which the pupil reacts, and at F a group of contacts permitting the determination of the simple reactions. A switch G permits, in combination with the switch A, the passage of the simple reactions to the complex reactions.

By simple reaction is meant as has already been said, a reaction of a pupil to a given and known stimulus, and in the shortest possible time-interval. This reaction is measured by means of a chronoscope, the needle of which is put in action by the instructor; and the pupil has to stop it immediately.

The two terminals marked + and − permit the connection of the apparatus to two sources of current, the pairs of terminals 1, 2, 3, 4 permit the connection of the apparatus to four chronoscopes or to one chronoscope with four dials. With the exception of the determination of the time of simple reactions, the four chronoscopes are controlled by corresponding relays of the group B, and these relays are normally energized i. e. in the position illustrated, and fall only when a chronoscope is put in action, and are immediately energized again when the chronoscope is stopped.

When the time-intervals of simple reactions are determined, the switch A is placed to the left, in the position other than that illustrated, and this is also the case for the switch G, which must be on the contact 5. At that point, only the chronoscope 1 is in action, and the circuit of its relay passes through all the contacts, less one, of the group C and the group of contacts utilized for the operation belonging to the group F. The said group F comprises a circuit closer 6 which is normally open, and the act of opening of which constitutes the manifestation of the reaction, and causes the stopping of the said chronoscope. These operations can, however, take place only when the corresponding relay is deenergized, and this is obtained by keeping one or other of the keys of the group C depressed, which will be described further on, and this action is effected by suitable means, such as a simple weight, bolt, or the like.

The current passes through the following circuit:

Positive terminal of the left bottom pair of terminals, conductor 8, resistance 9, switch G, terminal 5, contacts 7 and 6, conductors 10 and 11, armature 12 and contact 13 upon which the armature rests, conductor 14, first terminal of group 1, chronoscope (not shown), second terminal of group 1, conductor 15 and back to the negative terminal of current supply.

This circuit closes immediately the instructor has closed the circuit closer 6, and opens immediately the pupil reacts by opening he circuit-closer 7. The chronoscope then exactly measures the time which has elapsed between said two operations.

It will be seen that by incorporating the resistance 9 in the circuit which has just been described, the chronoscope is protected, and its coils can remain energized as long as desired without fear of being damaged.

When it is desired to pass from simple reactions to complex reactions, the switches A and G are displaced in such a manner as to bring them into the position shown. The switch D is placed either in the manner shown, if optical stimuli are to be used, or in the other position, if acoustic stimuli are to be used.

The four relays B are then energized, and due to this, the four chronoscopes can be utilized. The optical signals, which are constituted by lamps such as 16, or the acoustic signals which are represented by resistances such as 17, are in each case five in number, and can be set into action by depressing, as will be seen, one or other of the keys of the apparatus C. The reactions of the pupil are then not only registered by the chronoscopes, but also rendered visible by the illumination of the lamps such as the lamp 18. These reactions are manifested in the closing of one or other of the circuit-closers in the group E. Both the circuit-closers and the chronoscopes are only four in number, because one of the five disposable signals corresponds to an inhibition.

Assuming that optical signals are then used, and that the instructor acts upon one of them by depressing the key 19 of the apparatus C. In its rest or inactive position, said switch key forms the following circuit:

Positive terminal at the top right hand of the drawing, conductor 20, contact 21 of the switch A, conductor 22, key 19, contact 23, conductor 24, contact 25 of the switch A, conductor 26, resistance 27, conductor 28, relay 29, conductor 30, back to the negative terminal. The relay 29 is, consequently, energized, and its armature is in the position shown. All the relays are, moreover, energized, each by means of a circuit which passes through one of the keys C, with the exception of the key 31, which controls the inhibiting signal.

By depressing the key 19, the circuit described is consequently opened, the armature 32 falls, and the third chronoscope is put into action by means of the following circuit:

Positive terminal at the bottom left hand of the drawing, conductor 8, resistance 9, switch G, conductor 11, conductor 33, armature 32, conductor 34, contact 35 of the switch A, conductor 36, chronoscope 3 not shown, conductor 15 and back to the negative terminal.

The depression of the key 19 has the further effect of closing another circuit by means of the contact 37. The circuit is as follows:

First positive aforesaid terminal, conductor 20, contact 21, conductor 22, key 19, contact 37, contact 38 of the switch D, luminous signal 39, conductors 40 and 30, back to the negative terminal. Thus, when the relay 29 is deenergized, and the chronoscope 3 is put in action, the optical signal 39 is illuminated. The reaction which should follow gives rise to signals to the muscles to act immediately to stop the chronoscope. The pupil, to effect this, must close the contact 41 of the group E. This contact corresponds to said chronoscope and, according to a previous arrangement, to that of the signals which has just been given. The contact 41 closes the following circuit:

Positive terminal at the top right hand of the drawing, conductor 42, contact 41, control lamp 43, conductor 44, contact 45 of the switch A, conductor 28, relay 29, conductor 30, back to the negative terminal.

As will be seen, the pupil reenergizes the relay 29, which stops the chronoscope and simultaneously energizes the control lamp 43 which is disposed in front of the key 19. This permits the instructor to become immediately aware of the accuracy of the reaction. The lamp 43 moreover replaces the resistance 27 of the first circuit of the relay. The circuit is consequently always supplied with a similar current, and can in no wise be short-circuited across its source.

In front of each key of the apparatus C is disposed such a control lamp.

The inhibiting key 31 acts on only one signal, the luminous signal 46 in the case represented. No other mechanism corresponds to this signal, and any control lamp which the pupil might illuminate in answer to this signal would reveal an error on his part.

However, a lamp 47 is disposed in front of this key. The object of this lamp is not to determine the pupil's reaction time, but to determine the time-interval during which the instructor depresses the inhibiting key. It is indeed necessary that this time-interval be not too short, so as to leave the pupil both the time and the possibility of making a mistake. To this end, the lamp 47 is under-volted, and the instructor must wait each time until it reaches incandescence.

As will be seen it is only necessary to inverse the direction of the switch B in order to pass from exercises with optical stimuli to those with acoustic stimuli.

Fig. 2 shows a constructional embodiment of the controlling device C of Fig. 1.

The apparatus comprises a box 47 which has a sloping front with notches 48 in its back part, in which notches the keys 49 may move, and which keys may be depressed (see position of the key 50); the said keys correspond, for example, to the movements of control ordinarily encountered in driving a car.

In the apertures 51 are disposed the lamps which indicate the reactions. The said lamps are illuminated behind some screens on which a phrase or term corresponding to the desired reaction is written, and the same phrase or term is written in front of each key 52.

In view of the fact that the signals are to be transmitted purely at random, it is impossible to leave this operation to the instructor's imagination, for every person acts according to a certain rhythm peculiar to him, and this would cause false results once the pupil has learned the rhythm. In order to avoid said disadvantage, there is provided, in the inside of the box, a roll 53, on which a band of paper revolves, and which band of paper advances a certain distance each time a key is depressed, and in such a manner as to cause the appearance of a point, such as shown at 54, in a corresponding window. The instructor then has only to depress the keys, which are indicated to him by the appearance of the points. The arrangement of the points is not the work of a human mind, but that obtained by any game of hazard, for example by throwing dice. The said bands of paper are interchangeable, so that there is no possible means by which the pupil could adapt himself to a certain order in the succession of signals given.

Figs. 3 and 4 show a key in section, and in two different positions. In conformity with the diagram, a contact such as 55 encounters, in its rest or inactive position, a second contact 56. By depressing said key, said contacts separate simultaneously with the closing of a new circuit passing through the contact 57. The said figures show a simple manner of disposing the said different contacts in such a manner as to ensure the absolutely simultaneous opening and closing of the two circuits coming into play. The construction and particularly the conducting part of the contact 57 is preferably made very resilient, so as to attenuate any noise which might possibly divide the attention of the pupil.

Figs. 5 and 7 show how the optical signal which consists of differently coloured lamps may be disposed. It is so disposed that its colours all appear in the same spot, so that the pupil is not obliged to turn his eyes or head on the appearance of each signal.

For this purpose use if made of a case which terminates in a sharp cone 58 in such a manner that the light which is projected by the lamps which are placed in the different partitions on the base 59, may produce approximately the same luminous effect in the opening 60 at the top of the cone.

Fig. 7 shows the disposition of the lamps 61 in their respective compartments. There are six lamps for five signals; one of said lamps gives a soft white continuous light so that the eyes of the pupil are not dazzled when one or other of the signals flashes.

From the foregoing description may be gathered the manner in which the apparatus is used. The members F and the chronoscope, which is connected to the terminals 1, are used for the exercise of the smallest possible simple reaction i. e. for the value which has been noted as being the characteristic peculiar to the pupil.

Afterwards, by means of the other members of the apparatus the complex reactions are exercised until the time-interval taken by them be on an average equal to the time-interval characteristic of the pupil. The reactions may be studied both from the acoustic and from the optical point of view, or only from one of said points of view. As has already been said, it is not necessary to read successively all the times registered during the exercise of the complex reactions. It is, on the contrary, preferable to work from the start according to a rhythm which is smoothly accelerated as rapidly as possible, between the giving of the signals and the answers of the pupil. The indication lamps are very useful, because they permit the instructor to make immediate observations to the pupil, who thus feels himself closely observed.

In the case where it is desired to combine the apparatus with a model automobile, or a similar vehicle, it is sufficient to adapt the four contacts E to the parts of the model automobile by means of which it is desired that the pupil should react. One of the said contacts might, for example, be adapted to the foot brake, and the other to the accelerator. The two remaining contacts might be put into action by the rotation to the left and right, respectively, of the steering wheel. The inscription placed, at 51 and 52, on the control device box, could, in this case, bear the corresponding inscriptions: "Apply brake", "Accelerate", "Bear left", "Bear right". There could also be an agreement between the instructor and the pupil, before-hand whereby a red signal would signify: "pull up" (danger), a blue signal, "accelerate" (drive ahead), a green signal, "bear right" (roadside, green meadow), and finally a yellow signal, "bear left" (towards the yellow or bright centre of the road). The latter indications would, of course, have to be interchanged in the case of those countries where the rule of the road is "drive left."

It was said near the beginning of this description that by displacing the switch A to the left, the circuits of all the keys C were located in series on the first relay, with the exception of the inhibiting key. This permits a simplification in the exercise of the complex reactions i. e., if it is not desired to take the time necessary to read the four chronoscopes, or to read the four dials of one multiple chronoscope, and to draw up separate tables, the time-intervals of all the reactions may be read on the same chronoscope. This may be done, for example, when the reactions of the pupil mark times approximately similar for both hands, for both feet, or for the whole four members, a case which in practice happens rather frequently.

What I claim is:—

1. Apparatus for quickening the speed of a pupil's reactions to an approximation of his individual maximum, to adapt him for example as a vehicle driver, comprising an auxiliary circuit to be made by the instructor and broken by the pupil, a main supply circuit, a switch for inserting said auxiliary circuit into said main circuit, a chronoscope in said main circuit for measuring the time between make and break in said auxiliary circuit, a third circuit, a relay in said third circuit and having its armature in the main circuit for interrupting the latter when desired, and a switch in said third circuit for closing the same on a source of current supply.

2. Apparatus for quickening the speed of a pupil's reactions to an approximation of his individual maximum, to adapt him for example as a vehicle driver, comprising a single circuit for determining the time of a single reaction of the pupil, a set of separate circuits for determining the pupil's reactions to various combinations of signal indicia, a switch for throwing one or the other of said two sets of circuits in action, a plurality of chronoscopes, a circuit for each chronoscope, one chronoscope for each circuit of said set of separate circuits, a set of relays, one for each of said chronoscopes and having their armatures so connected to the chronoscope circuits that when the relays are energized they will maintain the chronoscopes inoperative, a double throw switch for each one of said set of separate circuits, to be operated by the instructor, and the inoperative position of which maintains the chronoscopes energized, signalling means for each one of said set of separate circuits, throw of anyone of said switches into its operative position energizing the signalling means for corresponding circuit, deenergizing the corresponding relay, and completing the circuit through the corresponding chronoscope, and a set of circuits, one for each relay, adapted to be connected across said relays, for the pupil to close and capable of reenergizing the relays so that the latter will break the chronoscope circuit, an auxiliary circuit adapted to be made by the instructor and broken by the pupil, and means for inserting said auxiliary circuit in said single circuit, movement of said first-mentioned switch to close said single circuit causing the insertion of one of said chronoscopes in said single circuit.

3. Apparatus for quickening the speed of a pupil's reactions to an approximation of his individual maximum, to adapt him for example as a vehicle driver, comprising a plurality of separate circuits for determining the times of reactions of the pupil to each indication of various combinations of signal indicia, a plurality of chronoscopes, a circuit for each chronoscope, one chronoscope for each circuit of said plurality of separate circuits, a set of relays, one for each of said chronoscopes and having their armatures so connected to the chronoscope circuits that when the relays are energized they will maintain the corresponding chronoscope inoperative, a double-throw switch for each one of said plurality of separate circuits adapted to be operated by the instructor, the inoperative position of each switch maintaining the corresponding chronoscope energized, signalling means for each one of the said plurality of separate circuits, throw of anyone of the switches into its operative position energizing the signalling means for the corresponding circuit, deenergizing the corresponding relay, and completing the circuit through the corresponding chronoscope, and a set of circuits, one for each relay, adapted to be connected across said relays, for the pupil to close and capable of reenergizing the relays so that the latter will break the chronoscope circuit which he believes has been completed.

4. Apparatus for quickening the speed of a pupil's reactions to an approximation of his individual maximum, to adapt him for example as a vehicle driver, comprising a plurality of separate circuits for determining the times of reactions of the pupil to each indication of various combinations of signal indicia, a plurality of chronoscopes, a circuit for each chronoscope, one chronoscope for each circuit of said plurality of separate circuits, a set of relays, one for each of said chronoscopes and having their armatures so connected to the chronoscope circuits that when the relays are energized they will maintain the corresponding chronoscope inoperative, a double-throw switch for each one of said plurality of separate circuits adapted to be operated by the instructor, the inoperative position of each switch maintaining the corresponding chronoscope energized, an audible signalling means for each one of the said plurality of separate circuits, throw of anyone of the switches into its operative position energizing the signaling means for the corresponding circuit, deenergizing the corresponding relay, and completing the circuit through the corresponding chronoscope, and a set of circuits, one for each relay, adapted to be connected across said relays, for the pupil to close to and capable of reenergizing the relays so that the latter will break the chronoscope circuit which he believes has been completed.

5. Apparatus for quickening the speed of a pupil's reactions to an approximation of his individual maximum, to adapt him for example as a vehicle driver, comprising a plurality of separate circuits for determining the times of reactions of the pupil to each indication of various combinations of signal indicia, a plurality of chronoscopes, a circuit for each chronoscope, one chronoscope for each one of said plurality of separate circuits, a set of relays, one for each of said chronoscopes and having their armatures so connected to the chronoscope circuits that when the relays are energized they will maintain the corresponding chronoscope inoperative, a double-throw switch for each one of said plurality of separate circuits adapted to be operated by the instructor, the inoperative position of each switch maintaining the corresponding chronoscope energized, a luminous signalling means for each one of the said plurality of separate circuits, throw of any one of the switches into its operative position energizing the signalling means for the corresponding circuit, deenergizing the corresponding relay, and completing the circuit through the corresponding chronoscope, and a set of circuits, one for each relay, adapted to be connected across said relays, for the pupil to close and capable of reenergizing the relays so that the latter will break the chronoscope circuit which he believes has been completed.

6. Apparatus for quickening the speed of a pupil's reactions to an approximation of his individual maximum, to adapt him for example as a vehicle driver, comprising a plurality of separate circuits for determining the times of reactions of the pupil to each indication of various combinations of signal indicia, a plurality of chronoscopes, a circuit for each chronoscope, one chronoscope for each one of said plurality of separate circuits, a set of relays, one for each of said chronoscopes and having their armatures so connected to the chronoscope circuits that when the relays are energized they will maintain the corresponding chronoscope inoperative, a double-throw switch for each one of said plurality of separate circuits adapted to be operated by the instructor, the inoperative position of each switch maintaining the corresponding chronoscope energized, signalling means for each one of the said plurality of separate circuits, throw of any one of the switches into its operative position energizing the signalling means for the corresponding circuit, deenergizing the corresponding relay, and completing the circuit through the corresponding chronoscope, a set of circuits, one for each relay, adapted to be connected across said relays, for the pupil to close and capable of reenergizing the relays so that the latter will break the chronoscope circuit which he believes has been completed, and signalling means in each circuit of said branched sets of circuits, and adapted to be energized when the pupil closes a selected one of said circuits, to indicate to the instructor which circuit the pupil has closed.

7. Apparatus for quickening the speed of a pupil's reactions to an approximation of his individual maximum, to adapt him for example as a vehicle driver, comprising a plurality of separate circuits for determining the times of reactions of the pupil to each indication of various combinations of signal indicia, a plurality of chronoscopes, a circuit for each chronoscope, one for each one of said plurality of separate circuits, a set of relays, one for each of said chronoscopes, and having their armatures so connected to the chronoscope circuits that when the relays are energized they will maintain the corresponding chronoscope inoperative, a double-throw switch for each of said allied circuits adapted to be operated by the instructor, the inoperative position of each switch maintaining the corresponding chronoscope energized, signalling means for each one of the said plurality of separate circuits, throw of any one of the switches into its operative position energizing the signalling means for the corresponding circuit, deenergizing the corresponding relay, and completing the circuit through the corresponding chronoscope, a set of circuits, one for each relay, adapted to be connected across said relays, for the pupil to close and capable of reenergizing so that the latter will break the chronoscope circuit which he believes has been completed, an additional circuit similar to said plurality of separate circuits but adapted to be closed directly across the source of current supply without passing through a chronoscope, and signalling means in said last-mentioned circuit to indicate closure thereof and similar to said first-mentioned signalling means.

8. Apparatus for quickening the speed of a pupil's reactions to an approximation of his individual maximum, to adapt him for example as a vehicle driver, comprising a plurality of separate circuits for determining the times of reactions of the pupil to each indication of various combinations of signal indicia, a plurality of chronoscopes, a circuit for each chronoscope, one for each one of said plurality of separate circuits, a set of relays, one for each of said chronoscopes, and having their armatures so connected to the chronoscope circuits that when the relays are energized they will maintain the corresponding chronoscope inoperative, a double-throw switch for each of said allied circuits adapted to be operated by the instructor, the inoperative position of each switch maintaining the corresponding chronoscope energized, signaling means for each one of the said plurality of separate circuits, throw of any one of the switches into its operative position energizing the signalling means for the corresponding circuit, deenergizing the corresponding relay, and completing the circuit through the corresponding chronoscope, a set of circuits one for each relay, adapted to be connected across said relays, for the pupil to close and capable of reenergizing the relays so that the latter will break the chronoscope circuit which he believes has been completed, an additional circuit similar to said plurality of separate circuits but adapted to be closed directly across the source of current supply without passing through a chronoscope, signalling means in said last-mentioned circuit to indicate closure thereof and similar to said first-mentioned signalling means, and a lamp in said last-mentioned circuit adapted to come to incandescence only after a predetermined lapse of time following closure of said circuit, the pupil being expected not to react to such signal and the lamp indicating the closure of that particular circuit.

9. In an apparatus for quickening the speed of a pupil's reactions to an approximation of his individual maximum, to adapt him for example as a vehicle driver, a box, a plurality of signalling means in said box for indicating to the pupil each a different one of a plurality of duties which must be performed immediately, keys adapted to be depressed in order to cause the energization of selected ones of said signalling means, and a duplicate set of signalling means, corresponding ones of which are adapted to be energized by the pupil in response to that one of the first-mentioned signalling means which has been energized, variation between the emitted and received signals from said sets of signalling means indicating error on the part of the pupil.

10. In an apparatus for quickening the speed of a pupil's reactions to an approximation of his individual maximum, to adapt him for example as a vehicle driver, a box, a plurality of signalling means for indicating each a different one of a plurality of duties to be performed immediately by the pupil, a plurality of keys to be depressed by the instructor to cause the energization of selected ones of said signalling means, a movable member in said box adapted to be moved a predetermined distance for each depression of said keys, to bring a legend beneath a sight opening in order to advise the instructor as to the next indication to be transmitted by a selected one of said plurality of signalling means, and a duplicate set of signalling means on said box corresponding ones of which are adapted to be energized when the pupil performs the indicated duty, variation between the emitted and received signals from said sets of signalling means indicating error on the part of the pupil.

HUGO HEINIS.